United States Patent [19]

Richardson et al.

[11] Patent Number: 4,681,686
[45] Date of Patent: Jul. 21, 1987

[54] COTELOMER COMPOUNDS

[76] Inventors: Norman Richardson, 21 Grey Street, Middleton, Manchester, M24 3UF, England; Brian Holt, 70 Moss Park Road, Stretford, Manchester, M32 9HQ, England; Barry Cook, 11 Warwick Drive, Urmston, Manchester, M31 2AY, England

[21] Appl. No.: 753,510

[22] Filed: Jul. 10, 1985

Related U.S. Application Data

[63] Continuation-in-part of Ser. No. 691,083, Jan. 14, 1985, abandoned.

[30] Foreign Application Priority Data

Jan. 13, 1984 [GB] United Kingdom ............... 8400848

[51] Int. Cl.$^4$ ................................................ C02F 5/14
[52] U.S. Cl. ................................... 210/699; 210/701; 210/700; 252/175; 252/180; 252/181; 526/233; 526/240; 526/273; 526/277; 526/278
[58] Field of Search ............... 210/699, 701; 252/175, 252/180, 181; 526/233, 240, 273, 277, 278

[56] References Cited

U.S. PATENT DOCUMENTS

| | | | |
|---|---|---|---|
| 2,957,931 | 10/1960 | Hamilton et al. | 260/403 |
| 3,709,815 | 1/1973 | Boothe et al. | 252/180 |
| 3,709,816 | 1/1973 | Walker et al. | 252/180 |
| 3,928,196 | 12/1975 | Persinski et al. | 252/180 |
| 4,015,991 | 4/1977 | Persinski et al. | 106/90 |
| 4,029,577 | 6/1977 | Godlewski et al. | 252/180 |
| 4,052,160 | 10/1977 | Cook et al. | 252/180 |
| 4,207,405 | 6/1980 | Masler, III et al. | 525/328 |
| 4,374,733 | 2/1983 | Snyder et al. | 210/701 |
| 4,389,324 | 6/1983 | Keller | 252/180 |
| 4,534,866 | 8/1985 | Becker | 210/697 |
| 4,552,665 | 11/1985 | Ralston et al. | 210/697 |

FOREIGN PATENT DOCUMENTS

| | | | |
|---|---|---|---|
| 173198 | 10/1984 | Japan | 252/180 |
| 1414964 | 11/1975 | United Kingdom | 210/699 |
| 1458235 | 12/1976 | United Kingdom . | |
| 1572406 | 7/1980 | United Kingdom . | |

Primary Examiner—Robert A. Wax

[57] ABSTRACT

New cotelomer compounds having the formula I

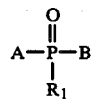 (I)

and salts thereof wherein A is a random polymeric residue comprising at least one unit of formula II

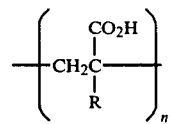 (II)

and at least one unit of formula III, different from a unit of formula II,

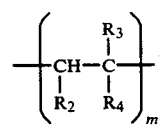 (III)

and B is hydrogen or a residue A; wherein
m and n are integers such that the sum of m+n is an integer of from 3 to 100, the ratio of n:m being from 99 to 1:1 to 99, provided that the resulting telomers are water-soluble and wherein m and/or n in a residue A may be the same as or different from m and/or n in a residue B; R is hydrogen, methyl or ethyl;
$R_1$ is a residue —OX, wherein X is hydrogen, an alkali- or alkaline earth metal, ammonium or an amine residue;
$R_2$ is hydrogen, methyl or a residue —$CO_2R_5$, wherein $R_5$ is hydrogen or a straight- or branched chain alkyl residue having 1 to 8 carbon atoms;
$R_3$ is hydrogen, a straight- or branched chain alkyl residue having 1 to 4 carbon atoms, hydroxymethyl or a residue —$CO_2R_6$, wherein $R_6$ is hydrogen, a residue of formula

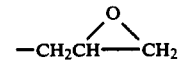

a residue of formula —[$CH_2$—$CH(R_9)O]_zH$, in which $R_9$ is hydrogen, methyl or phenyl and z is an integer from 1 to 20, or $R_6$ is a straight- or branched chain alkyl residue having 1 to 8 carbon atoms or by a group $SO_3M$ in which M is hydrogen or an alkali- or alkaline earth metal atom;
$R_4$ is a residue —$CO_2R_6$ (wherein $R_6$ has its previous significance), a straight- or branched alkyl residue having 1 to 8 carbon atoms optionally substituted by one to three carboxylic acid groups, a phenyl residue, an acetyl residue, hydroxymethyl, an acetomethyl residue, —$SO_3M$, —$CH_2SO_3M$ or —$PO_3M_2$, in which M is hydrogen or an alkali metal or alkaline earth metal atom, a residue —$CONR_7R_8$, wherein $R_7$ and $R_8$ are the same or different and each is hydrogen, a straight- or branched chain alkyl residue having 1 to 8 carbon atoms, hydroxymethyl or a residue —$CH(OH)CO_2M$, —$C(CH_3)_2CH_2SO_3M$ or —$C(CH_3)_2CH_2PO_3M_2$, wherein M has its previous significance, or —$N(R_{10})COCH_3$, in which $R_{10}$ is hydrogen or $C_1$-$C_4$ straight or branched chain alkyl group.

Compounds I are useful as corrosion and/or scale inhibitors in aqueous systems, as agents for facilitating dispersion of particulate matter in aqueous systems and as sealing smut inhibitors in processes for sealing anodically produced oxide layers on aluminium surfaces.

25 Claims, No Drawings

COTELOMER COMPOUNDS

CROSS REFERENCE

This is a continuation-in-part of application Ser. No. 691,083 filed Jan. 14, 1985, now abandoned.

DETAILED DESCRIPTION

The present invention relates to new cotelomer compounds, to a process for their production and to their use in treating aqueous systems to inhibit corrosion of metals in contact with the aqueous system and/or scale deposition therefrom and/or to facilitate dispersion of particulate matter in the aqueous system.

The majority of natural waters, and aqueous systems in general, contain dissolved salts of metals such as calcium, magnesium, barium and strontium. When the water or aqueous system is subjected to heating, the dissolved salts may be converted to insoluble salts and deposited as scale on heat transfer surfaces in contact with the water or aqueous system. If the water or aqueous system is concentrated even without heating, insoluble salts may also be precipitated.

Salt precipitation and scale deposition are troublesome and can cause increased costs in maintaining aqueous systems in good working order. Among the problems caused by scale deposits are obstruction of fluid flow, impedance of heat transfer, wear of metal parts, shortening of equipment life, localised corrosion attack, poor corrosion inhibitor performance, and unscheduled equipment shutdown. These problems can arise in water or oil wells, water pipes, steam power plants, water desalination plants, reverse osmosis equipment utilising aqueous solutions, heat echange equipment, and equipment concerned with the transport of products and by-products in aqueous media (e.g. fly ash formed during the combustion of coal in the production of electricity). The range of temperature over which these processes operate is wide, for example ambient temperatures are used for cooling water and elevated temperatures are used for steam power plants.

One method used to overcome the disadvantages associated with scale formation has involved the dismantling of equipment to enable the accumulated deposits to be cleaned out. This procedure is costly and does not prevent scale redeposition. Another method involves the use of strong alkali solution for the removal of, in particular, sulphate scale. It has been alleged that under suitable conditions of temperature and time the alkali treatment eventually provides an initial break up of the scale, which can then be removed by mechanical means. Such a method requires considerable time, and the removal of scale subsequent to treatment is often difficult.

There is therefore a need in this field for a composition which can be added to water or aqueous systems in very small quantities and which can cut down the rate at which insoluble salts are precipitated over a wide temperature range and also disperse those insoluble salts which are precipitated. Furthermore when any scale is formed, it should desirably be easily removeable from surfaces by simple mechanical means.

A number of additives have been proposed for addition to water or aqueous systems for these purposes, among them certain polyphosphates and polycarboxylic acids.

The polyphosphates have the advantage that they ultimately give a soft friable scale which is easily removed from surfaces, whereas the use of certain polycarboxylic acids e.g. polyacrylic acids is disadvantageous in that there results a hard adherent eggshell-like scale.

However, where water-treatment processes involving heat are used, the temperature are increasing, and since polyphosphate additives are readily hydrolysed at high temperature and as a result can give rise to the precipitation of insoluble calcium orthophosphate and other calcium phosphates, their usefulness is consequently limited.

In British Patent Specification No. 1 458 235 there is described and claimed a very effective method of inhibiting the precipitation of the scale forming salts of calcium, magnesium, barium and strontium from aqueous systems by adding to the aqueous system a telomeric compound of formula

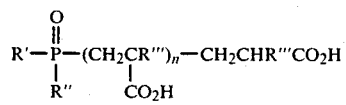

and salts thereof,
wherein $R'''$ is hydrogen, methyl or ethyl,
$R'$ is hydrogen, $C_1$–$C_{18}$ alkyl, $C_5$–$C_{12}$ cycloalkyl, aryl, aralkyl, a residue of formula

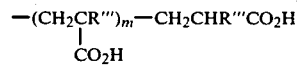

wherein $R'''$ has its previous significance and $n+m$ is an integer of at most 100, or $R'$ is a residue $-OX$, wherein $X$ is a hydrogen or $C_1$–$C_4$ alkyl; and
$R''$ is a residue $-OX$, wherein $X$ has its previous significance.

Moreover, there are a substantial number of commercial plants e.g. industrial boilers, cooling water systems, gas-scrubbing plants, slurry devices e.g. china clay slurry devices, in which it is important to maintain, in a suspended or dispersed state, various solid materials which are found in waters used in said plants. If such solids ceased to be suspended in the liquid, fouling of equipment may occur, e.g. in so-called "once-through" cooling systems. If there is a plentiful supply of water in close proximity to an industrial plant, cooling is often accomplished by passing the water through heat transfer equipment and then discharging the water back to its source. However, it is not feasible, from an economic standpoint, to filter the water conventionally due to the large quantities of water that are employed in this system. For this reason, formation of deposits readily occurs, within the plant, and it is normally necessary to stop the operation periodically for cleaning purposes. Moreover, corrosion of the plant leads to the deposition of iron oxides and/or iron salts which, if not carefully controlled, leads to blockage and mechanical failure of the plant.

Another problem area is the accumulation of silt and mud which collects in the bottoms of water storage tanks and ballst tanks of vessels and ships, thereby impairing the economy of maintenance and operation of the vessel.

A still further problem associated with undesired deposition from aqueous systems on to metal surface occurs during the sealing of anodically produced oxide layers on aluminium. During such sealing, using hot or boiling water, not only are the pores of the oxide layers sealed, but a thick velvety coating (sealing smut) is also formed over the whole surface. There is a need for an improved sealing smut inhibitor.

We have now found cotelomer compounds having scale-inhibiting properties which are comparable to those of the telomers of GB No. 1 458 235, and having excellent particulate matter dispersion properties, as well as good general corrosion inhibiting properties in aqueous systems. The new cotelomer compounds may also find use as sealing smut inhibitors.

Accordingly, the present invention provides new cotelomer compounds having the formula

and salts thereof wherein

A is a random polymeric residue comprising at least one unit of formula II

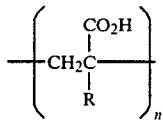

and at least one unit of formula III, different from a unit of formula II,

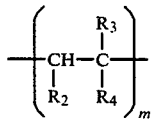

and
B is hydrogen or a residue A;
wherein
m and n are integers such that the sum of m+n is an integer of from 3 to 100, the ratio of n:m being from 99 to 1:1 to 99, provided that the resulting telomers are water-soluble and wherein m and/or n in a residue A may be the same as or different from m and/or n in a residue B;
R is hydrogen, methyl or ethyl;
$R_1$ is a residue —OX, wherein X is hydrogen, an alkali- or alkaline earth metal, ammonium or an amine residue;
$R_2$ is a hydrogen, methyl or a residue —$CO_2R_5$, wherein $R_5$ is hydrogen or a straight- or branched chain alkyl residue having 1 to 8 carbon atoms;
$R_3$ is hydrogen, a straight- or branched chain alkyl residue having
1 to 4 carbon atoms, hydroxymethyl or a residue —$CO_2R_6$, wherein $R_6$ is hydrogen, a residue of formula

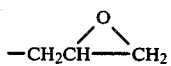

a residue of formula —$[CH_2—CH(R_9)O]_zH$ (in which $R_9$ is hydrogen, methyl or phenyl and z is an integer from 1 to 20) or $R_6$ is a straight- or branched chain alkyl residue having 1 to 8 carbon atoms and optionally substituted by a group $SO_3M$ or COOM (in which M is hydrogen or an alkali- or alkaline earth metal atom);

$R_4$ is a residue —$CO_2R_6$ (wherein $R_6$ has its previous significance), a straight- or branched alkyl residue having 1 to 8 carbon atoms optionally substituted by one to three carboxylic acid groups, a phenyl residue, an acetoxy residue, hydroxymethyl, an acetoxymethyl residue, —$SO_3M$, —$CH_2SO_3M$ or —$PO_3M_2$ or $PO_3M'_2$ (in which M is hydrogen or an alkali metal or alkaline earth metal atom and M' is M or $C_1-C_4$-alkyl), a residue —$CONR_7R_8$ (wherein $R_7$ and $R_8$ are the same or different and each is hydrogen, a straight- or branched chain alkyl residue having 1 to 8 carbon atoms, hydroxymethyl or a residue —CH(OH)-$CO_2M$, —$C(CH_3)_2CH_2SO_3M$ or —$C(CH_3)_2CH_2PO_3M_2$, wherein M has its previous significance) or —$N(R_{10})COCH_3$, in which $R_{10}$ is hydrogen or $C_1-C_4$ straight or branched chain alkyl.

Salts of the cotelomeric compounds of formula I are compounds in which some or all of the acidic hydrogens in the acidic compounds of formula I have been replaced by alkali metal ions, ammonium ions or quaternised amine radicals. These salts also have good activity in inhibiting the precipitation of insoluble salts from aqueous solution.

The compounds of formula I, reaction products containing compounds of formula I and salts thereof are effective in inhibiting the deposition of scale and precipitation of salts from aqueous solutions. The scale forming salts are derived from calcium, magnesium, barium or strontium cations and anions such as sulphate, carbonate, hydroxide, phosphate or silicate.

The compounds of formula I, reaction products containing compounds of formula I and salts thereof are particularly effective in inhibiting the deposition of calcium sulphate, magnesium hydroxide, calcium phosphate and calcium carbonate scale.

The compounds of formula I, reaction products containing these compounds and salts of these compounds also function as dispersing agents and/or antifoulants towards common deposits found in the water used in commercial plants, such as industrial boilers, cooling water systems, gas scrubbing plants and the aqueous slurries found in china clay operations. Examples of such deposits are iron oxides, calcium and magnesium deposits e.g. their carbonates, sulphates, oxalates and phosphates, and silt, alumina, silicates and clays.

$C_1-C_4$ Alkyl residues $R_3$ and $R_{10}$ are e.g. methyl, ethyl, n-propyl, isopropyl and n-butyl residues.

$C_1-C_8$ Alkyl residues $R_4$, $R_5$, $R_6$, $R_7$ and $R_8$ are e.g. methyl, ethyl, n-propyl, isopropyl, n-butyl, n-pentyl, n-hexyl and n-octyl residues. Carboxyl-substituted $C_1-C_8$ alkyl residues $R_4$ include e.g. carboxymethyl, carboxyethyl, carboxypropyl, 1,1-dicarboxymethyl or butane-2,3,4-tricarboxylic acid.

Alkali metal atoms X and/or M are, particularly, sodium or potassium atoms, and alkaline earth metal atoms X and/or M are calcium, barium and strontium atoms. Amine residues X are e.g. ammonium, —$N^+H(CH_3)_3$, —$N^+H(C_2H_5)_3$ or —$N^+H(CH_2CH_2OH)_3$.

Preferably B is a residue A as hereinbefore defined and preferably $R_1$ is a residue —OX, wherein X has its previous significance, but is especially an alkali metal, in particular sodium.

Preferred compounds of formula I are those wherein B is a residue A, wherein R is hydrogen or methyl, $R_2$ is hydrogen or a residue —$COOR_5$, in which $R_5$ is hydrogen, or $C_1$-$C_8$ alkyl, $R_3$ is hydrogen or —$CO_2R_6$ (wherein $R_6$ has its previous significance) and $R_4$ is a residue —$COOR_6$, wherein $R_6$ is hydrogen or $C_1$-$C_4$ alkyl or $R_4$ is $C_1$-$C_8$ alkyl optionally substituted by one to three carboxyl groups, a phenyl residue, acetomethyl, —$SO_3M$ or —$PO_3M_2$ (in which M has its previous significance), —$CONR_7R_8$ (wherein $R_7$ and $R_8$ have their previous significance); or —$N(R_{10})COCH_3$ in which $R_{10}$ has its previous significance; $R_1$ has its previous significance; and the sum of m and n is from 3 to 32.

In order to optimise the hydrolytic stability of the compounds of Formula I, it is particularly preferred that $R_2$ and $R_3$ are each hydrogen or carboxyl and $R_4$ is carboxyl, $C_1$-$C_8$ alkyl optionally substituted by one to three carboxyl groups, a phenyl residue, acetomethyl, —$SO_3M$ or $PO_3M_2$ (in which M has its previous significance) —$CONR_7R_8$ (wherein $R_7$ and $R_8$ have their previous significance) or $N(R_{10})COCH_3$ in which $R_{10}$ has its previous significance viz compounds of formula I are preferred which are free of readily hydrolysable ester groups. The preferred ratio of m:n is from 90:10 to 10:90.

Examples of the bases with which compounds of formula I may be reacted in order to form partial or complete salts are the hydroxides and carbonates of sodium, potassium and ammonia. Similarly organic bases may be employed, for instance, primary, secondary and tertiary alkyl and substituted alkyl amines in which the total carbon number does not exceed twelve, such as triethanol amine.

According to the present invention, there is also provided a process for the production of the cotelomer compounds of formula I comprising reacting n moles of an acid having the formula IV $$CH_2=CR—CO_2H \quad (IV)$$

m moles of a compound having the formula V

(V)

wherein R, $R_2$, $R_3$, $R_4$, m and n have their previous significance, and one mole of a compound of formula VI

(VI)

wherein $R_1$ has its previous significance, and is, in particular, a residue —OX in which X is an alkali metal, especially sodium.

Examples of co-monomers of formula V include:
acrylamide, N-hydroxymethylacrylamide, N,N-dimethylacrylamide, N-vinyl-N-methylacetamide, N-allylacetamide, N-acrylamidoglycollic acid, methacrylic acid, methyl methacrylate, maleic acid, 2-carboxyethyl acrylate, 3-buten-1,2,3-tricarboxylic acid, dimethyl maleate, diethyl maleate, diethyl fumarate, itaconic acid, dimethyl itaconate, vinyl sulphonic acid, allyl sulphonic acid, 4-styrene sulfonic acid, sodium- or potassium salts of 3-sulphopropyl acrylic acid, 2-acrylamido-2-methylpropane sulphonic acid, vinyl phosphonic acid, styrene phosphonic acid, allyl alcohol, allyl acetate, vinyl acetate, styrene, α-methyl styrene, hexene, octene, N-acrylamidopropane sulphonic acid, glycidyl methacrylate, crotonic acid, ethyl crotonate, polyethylene glycol esters and polypropylene glycol esters of (meth)acrylic acids.

Alternatively a salt of the compound of formula V may be employed in which the acidic hydrogens have been partially or completely replaced by cations derived from the salt forming bases hereinbefore described.

The reaction is carried out in a solvent inert under the reaction conditions and in the presence of a reaction initiator as described in U.S. Pat. No. 2,957,931. Suitable reaction solvents are for instance, water, aqueous ethanol or dioxan. Suitable reaction initiators include materials which decompose under the reaction conditions to yield free radicals. Examples of such materials are bisazoisobutyronitrile, organic peroxides such as benzoyl peroxide, methyl ethyl ketone peroxide, ditertiary butyl peroxide and monobutyl hydroperoxide, and oxidising agents such as hydrogen peroxide, sodium perborate and sodium persulphate.

The products of this process are obtained as solutions. These may be subjected to partial or complete evaporation under reduced pressure. The unpurified reaction products may be used as the cotelomeric products in the method of the invention. The reaction products may also be purified. The purification procedure may be:

(i) by evaporation of reaction solvent, dissolving the residue in water, washing with a water immiscible organic solvent e.g. ether and evaporation of the aqueous solution, (ii) by evaporation of reaction solvent, dissolving the residue in methanol and reprecipitation by addition of ether.

When the reaction products are employed without purification, the ratio of reactants is important in that the activity of the product varies accordingly.

Salts of the compounds of formula I in which some or all of the acidic hydrogens in the compounds of formula I have been replaced by the cations derived from the salt forming bases hereinbefore defined, may be prepared by mixing an aqueous or alcoholic solution of the compound of formula I with an aqueous or alcoholic solution containing an amount of the requisite base in excess of, equal to or less than the stoichiometric requirement. The solvent may then be removed by evaporation. In many of the water-containing systems where inhibitors of this invention would prove useful, the water is sufficiently alkaline to effect neutralisation and only the product of the invention need be added.

The precise nature of the products of this preparative process is not entirely clear. Nuclear magnetic resonance examination has shown, however, that in addition to unreacted compound of formula VI and polymerised compounds derived from an acid of formula IV and compounds of formula V, the reaction product of the process hereinbefore described contains a compound of the formula I as hereinbefore defined.

The present invention further provides a method of treating a wholly or partly aqueous system, in contact with metal surfaces, in order to inhibit scale formation on the metal surfaces and/or inhibit corrosion of the metal surfaces and/or to facilitate dispersion of particulate matter in the aqueous system, and/or inhibit sealing smut deposition therefrom comprising adding to the aqueous system a functionally-effective amount of a cotelomeric compound of formula I, as hereinbefore defined, or a salt thereof.

In practice, the amount of the compound of formula I used to treat the metal surface e.g. by adding the compound to the aqueous system in contact with the metal surface will vary depending upon the protective function which the compound is required to perform. For corrosion-inhibiting protective treatments, optionally in combination with scale inhibiting treatments, the amount of said compound added to the aqueous system is conveniently within the range of from 0.1 to 50.000 ppm (or 0.00001 to 5% by weight), preferably from 1 to 500 ppm (or 0.0001 to 0.05% by weight), based on the aqueous system. For solely anti-scale purposes, the amount of said compound of formula I used is conveniently from 1 to 200 ppm, preferably 1 to 30 ppm, based on the aqueous system.

For most relatively dilute aqueous dispersions treated, the amount of compound of formula I to be used, as a dispersant, in the method of the invention is conveniently from 1 to 200, preferably 2 to 20 parts per million by weight. However, aqueous slurries to be treated may require much higher levels of compound of formula I, e.g. 0.1 to 5% by weight on total solids which can be as high as 70% by weight of the total aqueous system.

When used in an aqueous sealing solution, as sealing smut inhibitor, for the treatment of anodically-produced oxide layers on aluminium surfaces, the amount of a compound of formula I is conveniently within the range of from 0.0005 to 0.5 g/l of the aqueous solution employed in the sealing process.

With respect to aqueous system which may be treated according to the present invention, of particular interest with respect to combined corrosion inhibition and anti-scale treatments are cooling water systems, steam generating systems, sea-water evaporators, hydrostatic cookers, gas scrubbing systems, closed circuit heating systems, aqueous-based refrigeration systems and down-well systems; for corrosion inhibition treatments alone, aqueous systems of particular interest include aqueous machining fluid formulations (e.g. for use in boring, milling, reaming, broaching, drawing, spinning, turning, cutting, sawing, grinding, and thread-cutting operations or in non-cutting shaping in drawing or rolling operations) aqueous scouring systems, engine coolants including aqueous glycol antifreeze systems, water/glycol hydraulic fluids; and aqueous based polymer surface-coating systems/or solvent-based polymer systems, e.g. those containing tetrahydrofuran, ketones or alkoxyalkanols.

The inhibitor used according to the invention may be used alone or in conjunction with other compounds known to be useful in the treatment of aqueous systems.

In the treatment of systems which are completely aqueous, such as cooling water systems, air-conditioning systems, steam-generating systems, sea-water evaporator systems, hydrostatic cookers, and closed circuit heating or refrigerant systems, further corrosion inhibitors may be used such as, for example, water soluble zinc salts; phosphates; polyphosphates; phosphonic acids and their salts, for example, acetodiphosphonic acid, nitrilotris methylene phosphonic acid and methylaminodimethylene phosphonocarboxylic acids and their salts, for example, those described in German Offenlegungsschrift No. 2 632 774, hydroxyphosphonacetic acid, 2-phosphonobutane-1,2,4-tricarboxylic acid and those disclosed in GB No. 1 572 406; chromates, for example, sodium chromate; nitrates, for example, sodium nitrate; nitrites, e.g. sodium nitrite; molybdates, e.g. sodium molybdate; tungstates; silicates,. e.g. sodium silicate; benzotriazole, bis-benzotriazole or copper deactivating benzotriazole or tolutriazole derivatives or their Mannich base derivatives; N-acyl sarcosines; N-acylamino diacetic acids; ethanolamines; fatty amines; and polycarboxylic acids, for example, polymaleic acid and polyacrylic acid, as well as their respective alkali metal salts, copolymers of maleic anhydride, e.g. copolymers of maleic anhydride and sulfonated stryene, copolymers of acrylic acid, e.g. copolymers of acrylic acid and hydroxyalkylated acrylic acid, and substituted derivatives of polymaleic and polyacrylic acids and their copolymers. Moreover, in such completely aqueous systems, the inhibitor used according to the invention may be used in conjunction with further dispersing and/or threshold agents, e.g. a polymerised acrylic acid (or its salts), phosphino-polycarboxylic acids (as described and claimed in British Pat. No. 1 458 235), hydrolysed polyacrylonitrile, polymerised methacrylic acid and its salts, polyacrylamide and copolymers thereof from acrylic and methacrylic acids, lignin sulphonic acid and its salts, tannin, naphthalene sulphonic acid/formaldehyde condensation products, starch and its derivatives, cellulose, acrylic acid/lower alkyl hydroxyacrylate copolymers, e.g. those described in U.S. Pat. No. 4 029 577, styrene/maleic anhydride copolymers and sulfonated styrene homopolymers, e.g. those described in U.S. Pat. No. 4 374 733 and combinations thereof. Specific threshold agents, such as for example, 2-phosphonobutane-1,2,4-tri-carboxylic acid, acetodiphosphonic acid, hydrolysed polymaleic anhydride and its salts, alkyl phosphonic acids, hydroxyphosphonoacetic acid 1-aminoalkyl-1,1-diphosphonic acids and their salts, and alkali metal polyphosphates, may also be used.

Precipitating agents such as alkali metal orthophosphates, carbonates; oxygen scavengers such as alkali metal sulphites and hydrazines; sequestering agents such as nitrilotriacetic acid and its salts; antifoaming agents such as silicones, e.g. polydimethylsiloxanes, distearylsebacamide, distearyl adipamide and related products derived from ethylene oxide and/or propylene oxide condensations, in addition to fatty alcohols, such as capryl alcohols and their ethylene oxide condensates; and biocides, e.g. amines, quaternary ammonium compounds, chlorophenols, sulphur-containing compounds such as sulphones, methylene bis thiocyanates and carbamates, isothiazolones, brominated propionamides, triazines, phosphonium compounds, chlorine and chlorine-release agents and organometallic compounds such as tributyl tin oxide, may be used.

If the system to be treated by the method of the invention is not completely aqueous, e.g. an aqueous machining fluid formulation, it may be e.g. a water dilutable cutting or grinding fluid.

The aqueous machining fluid formulations of the invention may be, e.g. metal working formulations. By "metal working", we mean reaming, broaching, drawing, spinning, cutting, grinding, boring, milling, turning, sawing, non-cutting shaping or rolling. Examples of water-dilutable cutting or grinding fluids into which the corrosion inhibiting combination may be incorporated include:

(a) aqueous concentrates of one or more corrosion inhibitors, and optionally one or more anti-wear additives, used at dilutions of 1:50 to 1:100, which are usually employed as grinding fluids;

(b) polyglycols containing biocides, corrosion inhibitors and anti-wear additives which are used at dilutions of 1:20 to 1:40 for cutting operations and 1:60 to 1:80 for grinding;

(c) semi-synthetic cutting fluids similar to (b) but containing in addition 10 to 25% oil with sufficient emulsifier to render the water diluted product translucent;

(d) an emulsifiable mineral oil concentrate containing, for example, emulsifiers, corrosion inhibitors, extreme pressure/anti-wear additives, biocides, anti-foaming agents, coupling agents etc.; they are generally diluted from 1:10 to 1:50 with water to a white opaque emulsion;

(e) a product similar to (d) containing less oil and more emulsifier which on dilution to the range 1:50 to 1:100 gives a translucent emulsion for cutting or grinding operations.

For those partly-aqueous systems in which the aqueous system component is an aqueous machining fluid formulation the inhibitor of the invention may be used singly, or in admixture with other additives, e.g. known further corrosion inhibitors and/or extreme-pressure additives.

Examples of other corrosion inhibitors which may be used in these aqueous systems, in addition to the inhibitor composition used according to the invention, include the following groups:

(a) Organic acids, their esters or ammonium, amine, alkanolamine and metal salts, for example, benzoic acid, p-tert-butyl benzoic acid, disodium sebacate, triethanolamine laurate, iso-nonanoic acid, triethanolamine salt of (p-toluene sulphonamido caproic acid), triethanolamine salt of benzene sulphonamido caproic acid, triethanolamine salts of 5-ketocarboxylic acid derivatives as described in European Pat. No. 41 927, sodium N lauroyl sarcosinate or nonyl phenoxy acetic acid;

(b) Nitrogen containing materials such as the following types: fatty acid alkanolamides; imidazolines, for example, 1-hydroxy-ethyl-2-oleyl-imidazolines; oxazolines; triazoles for example, benzotriazoles; or their Mannich base derivatives; triethanolamines; fatty amines; inorganic salts, for example, sodium nitrate; and the carboxy-triazine compounds described in European Patent Application No. 46 139;

(c) Phosphorus containing materials such as the following types: amine phosphates, phosphonic acids or inorganic salts, for example, sodium dihydrogen phosphate or zinc phosphate;

(d) Sulphur containing compounds such as the following types: sodium, calcium or barium petroleum sulphonates, or heterocyclics, for example, sodium mercaptobenzothiazole.

Nitrogen containing materials, particularly triethanolamine, are preferred.

Examples of extreme pressure additives which may be present in the systems treated according to the present invention include sulphur and/or phosphorus and/or halogen containing materials, for instance, sulphurised sperm oil, sulphurised fats, tritolyl phosphate, chlorinated paraffins or ethoxylated phosphate esters.

When triethanolamine is present in the aqueous treated according to the present invention, it is preferably present in an amount such that the ratio of inhibitor composition to triethanolamine is from 2:1 to 1:20.

The partly-aqueous systems treated by the method of the present invention may also be aqueous surface-coating compositions, e.g. emulsion paints and aqueous powder coatings for metallic substrates.

The aqueous surface-coating composition may be, e.g. a paint such as a styrene-acrylic copolymer emulsion paint, a resin, a latex, or other aqueous based polymer surface-coating system, to coat a metal substrate. The inhibitor composition used according to the invention may be employed to prevent flash rusting of the metal substrate during application of the surface coating and to prevent subsequent corrosion during use of the coated metal.

In aqueous surface-coating compositions treated by the method of the invention the inhibitor composition may be used singly, or in admixture with other additives, e.g. known corrosion inhibitors, biocides, emulsifiers and/or pigments.

The further known corrosion inhibitors which may be used are, e.g. those of classes (a), (b), (c) and (d) hereinbefore defined.

Examples of biocides which may be used in these aqueous systems, in addition to the compound of formula I, include the following:

Phenols, and alkyl- and halogenated phenols, for example, pentachlorophenol, o-phenylphenol, o-phenoxyphenol and chlorinated o-phenoxyphenol, and salicylanilides, diamines, triazines and organometallic compounds such as organomercury compounds and organotin compounds.

Examples of pigments which may be used in these aqueous systems, in addition to the compound of formula I, include titanium dioxide, zinc chromate, iron oxide and organic pigments such as the phthalocyanines.

Products comprising cotelomers of formula I also function as dispersing agents and/or antifoulants towards common deposits, e.g. iron oxides and/or iron salts, calcium and magnesium deposits, e.g. their carbonates, sulphates, oxalates and phosphates, and silt, alumina, silicates and clays found in such waters.

In particular, the method of the present invention may be applied to disperse deposits in an aqueous system containing 5–1500 ppm by weight of calcium ion as well as suspended solids. This aspect of the present invention finds particular use in the china clay industry in which it is important to obtain slurries which will not appreciably separate out during transportation from the clay pits to the user. At high concentrations of suspended solids in these slurries, the cotelomers of formula I have been found to disperse china clay and to be of value as "in-process" dispersants and as grinding aids.

The method of the invention may also be applied to inhibit the formation of undesired aluminium hydroxide layers (sealing smut) during sealing of anodically produced oxide layers on aluminium or alloys thereof. Thus, the compound of formula I may be added, as sealing smut inhibitor, to aqueous solutions to be used to seal said anodically produced oxide layers on aluminium (alloy) surfaces. Such solutions conventionally are of pH 4 to 8 and employed at 90°–100° C.

The following Examples further illustrate the present invention

EXAMPLE 1

Cotelomer of acrylic acid and sodium vinyl sulphonate in the ratio of 35.6:64.4 with sodium hypophosphite in the molar ratio of monomers:sodium hypophosphite 16:1.

A solution of 5.5 g (0.0625 mole) sodium hypophosphite in 100 g water is heated at reflux. To this solution is added, over a period of 2 hours, (a) a solution of 10.1 g sodium persulphate in 100 g water and (b) a mixture of 36 g (0.5 mole) acrylic acid and 188 g of a 35% aqueous solution of sodium vinyl sulphonate (=0.5 mole). After the addition is complete, the reaction mixture is heated for a further 2 hours at reflux.

The apparatus is adapted for distillation and the solution is concentrated until the solids content is 51.1%.

$^{31}P$ n.m.r. analysis shows peaks at 54.3–47.5 (due to monomers-P-monomers) downfield from $H_3PO_4$.

EXAMPLE 2

Cotelomer of acrylic acid and 2-acrylamido-2-methylpropane sulphonic acid in the ratio of 41:59 with sodium hypophosphite in the molar ratio of monomers:sodium hypophosphite of 24:1.

A solution of 2.75 g (0.03125 mole) sodium hypophosphite in 100 g water is heated to reflux. To this solution is simultaneously added, over a period of 2 hours, (a) a solution of 6.9 g sodium persulphate in 100 g water and (b) a solution of 36 g (0.5 mole) acrylic acid and 51.75 g (0.25 mole) 2-acrylamido-2-methylpropane sulphonic acid in 150 g water. On the completion of these additions, the reaction mixture is heated for a further 2 hours at reflux.

There is obtained 444.5 g of solution having solids content of 23.7% and $^{31}P$ n.m.r. analysis showing peaks at 54.2 (due to monomers-P-monomers) and 36.0 (due to H-P-monomers) each downfield from $H_3PO_4$.

EXAMPLE 3

Cotelomer of acrylic acid and acrylamide, in the ratio of 70:30 respectively, with sodium hypophosphite in the molar ratio of total monomers; sodium hypophosphite of 16:1.

To 150 g of water at reflux are simultaneously added over a period of 2 hours:

(a) a solution of 151.2 g acrylic acid, 64.8 parts acrylamide and 16.5 g sodium hypophosphite in 450 parts water and (b) a solution of 4.44 g sodium persulphate in 450 g water.

On the completion of the additions the reaction mixture is heated for a further 2 hours at reflux. The solution is then cooled to room temperature.

There are obtained 1137 g of a water white solution having solids content of 19.9% and $^{31}P$ n.m.r. analysis showing peaks at 41.2 (due to monomers-P-monomers) and 26.1 (due to H-P-monomers) each downfield from $H_3PO_4$.

EXAMPLE 4

Cotelomer of acrylic acid and acrylamidoglycollic acid, in the ratio of 83.2:16.8 respectively, with sodium hypophosphite in the molar ratio of total monomers:sodium hypophosphite of 16:1.

To a solution of 4.54 g sodium hypophosphite in 50 g water at 100° C. are simultaneously added over 2 hours:

(a) a solution of 6.37 g sodium persulphate in 100 parts water and (b) a solution of 10.9 g acrylamidoglycollic acid in 54 g acrylic acid.

On the completion of the addition the reaction mixture is heated for a further 2 hours at reflux then cooled to room temperature.

There are obtained 221 g of an amber coloured solution having solids content of 32.7% and $^{31}P$ n.m.r. analysis showing peaks at 51.2–48.5 (monomers-P-monomers) and 31.6–24.8 (H-P-monomers) each downfield from $H_3PO_4$.

EXAMPLE 5

Cotelomer of acrylic acid with styrene in the ratio of 87.4:12.6 respectively with sodium hypophosphite in the molar ratio of total monomers:sodium hypophosphite of 16:1.

The procedure of Example 4 is followed excepting that the acrylamidoglycollic acid is replaced by 7.8 g styrene.

There are obtained 219 parts of a milky dispersion which after filtering through a No. 4 porosity sintered funnel gives 218 g of a pale yellow solution having solids content of 32.5% and $^{31}P$ n.m.r. analysis showing peaks at 53.2–50.2 (monomers-P-monomers) and 33.0–30.3 (H-P-monomers) each downfield from $H_3PO_4$.

EXAMPLE 6

Cotelomer of acrylic acid with dimethyl maleate in the ratio of 83.3:16.7 respectively with sodium hypophosphite in the molar ratio of total monomers:sodium hypophosphite of 16:1.

The procedure of Example 4 is followed excepting that the acrylamidoglycollic acid is replaced by 10.8 g dimethyl maleate.

There are obtained 223.4 g of a pale yellow solution having solids content of 32.2% and $^{31}P$ n.m.r. analysis showing peaks at 53.3–50.2 (monomers-P-monomers) and 36.5 (H-P-monomers) each downfield from $H_3PO_4$.

EXAMPLE 7

Cotelomer of acrylic acid and crotonic acid in the ratio of 89.3:10.7 respectively with sodium hypophosphite in the molar ratio of total monomers:sodium hypophosphite of 16:1.

The procedure of Example 4 is followed excepting that the acrylamidoglycollic acid is replaced by 6.45 g crotonic acid.

There are obtained 218.7 parts of a water white solution having solids content of 32.1% and $^{31}P$ n.m.r. analysis showing peaks at 54.4–48.7 (monomers-P-monomers) and 27.0 (H-P-monomers) each downfield from $H_3PO_4$.

EXAMPLE 8

Cotelomer of acrylic acid and methacrylic acid, in the ratio of 89.3:10.7 respectively, with sodium hypophosphite in the molar ratio of total monomers:sodium hypophosphite of 16:1.

The procedure of Example 4 is followed excepting that the acrylamidoglycollic acid is replaced by 5.46 g methacrylic acid.

There are obtained 218.8 g of a clear solution having solids content of 32.0% and $^{31}P$ n.m.r. analysis showing peaks at 51.4–49.8 (monomers-P-monomers) and 27–25 (H-P-monomers) each downfield from $H_3PO_4$.

EXAMPLE 9

Cotelomer of a acrylic acid and vinyl acetate, in the ratio of 89.3:10.7 respectively, with sodium hypophosphite in the molar ratio of total monomers:sodium hypophosphite of 16:1.

The procedure of Example 4 is followed excepting that the acrylamidoglycollic acid is replaced by 6.45 g vinyl acetate.

There are obtained 219.1 g of solution having solids content of 31.6% and $^{31}$P n.m.r. analysis showing peaks at 51–49.9 (monomers-P-monomers) and 26.7–24.6 (H-P-monomers) each downfield from $H_3PO_4$.

EXAMPLE 10

Cotelomer of acrylic acid and allyl alcohol, in the ratio of 92.5:7.5 respectively, with sodium hypophosphite in the molar ratio of total monomers:sodium hypophosphite of 16:1.

The procedure of Example 4 is followed excepting that the acrylamidoglycollic acid is replaced by 4.35 g allyl alcohol.

There are obtained 215.4 g of solution having solids content of 31.7% and $^{31}$P n.m.r. analysis showing peaks at 54.8–49.9 (monomers-P-monomers) and 26.9 (H-P-monomers) each downfield from $H_3PO_4$.

EXAMPLE 11

Cotelomer of acrylic acid and diethylvinylphosphonate, in the ratio of 81.5:18.5 respectively, with sodium hypophosphite in the molar ratio of total monomers:sodium hypophosphite of 16:1.

The procedure of Example 4 is followed exception that the acrylamidoglycollic acid is replaced by 12.3 g diethylvinylphosphonate.

There are obtained 223.7 g of solution having solids content of 33.7% and $^{31}$P n.m.r. analysis showing peaks at 51.6–50 (monomers-P-monomers) and 34.5–32.5 (H-P-monomers) each downfield from $H_3PO_4$.

EXAMPLE 12

Cotelomer of acrylic acid and N-hydroxymethylacrylamide, in the ratio of 87.7:12.3 respectively, with sodium hypophosphite in the molar ratio of total monomers:sodium hypophosphite of 16:1.

The procedure of Example 4 is followed excepting that the acrylamidoglycollic acid is replaced by 7.57 g of N-hydroxymethylacrylamide.

There are obtained 209.9 g of solution having solids content of 31.4% and $^{31}$P n.m.r. analysis showing peaks at 50.4–47.7 (monomers-P-monomers) and 26.5–24.5 (H-P-monomers) each downfield from $H_3PO_4$.

EXAMPLE 13

Cotelomer of acrylic acid and itaconic acid in the ratio of 84.6:15.4 respectively, with sodium hypophosphite in the molar ratio of total monomers:sodium hypophosphite of 16:1.

The procedure of Example 4 is followed excepting that the acrylamidoglycollic acid is replaced by 9.8 g itaconic acid.

There are obtained 218.5 g of solution having solids content of 32.7% and $^{31}$P n.m.r. analysis showing peaks at 50.9–49.5 (monomers-P-monomers) and 26.0 (H-P-monomers) each downfield from $H_3PO_4$.

EXAMPLE 14

Cotelomer of acrylic acid and sodium vinyl sulfonate, in the ratio of 84.7:15.3 respectively, with sodium hypophosphite in the molar ratio of total monomers:sodium hypophosphite of 16:1.

A solution of 4.54 g sodium hypophosphite in 50 g water is heated to 100° C. To this solution are simultaneously added over a period of 2 hours:

(a) a solution of 6.37 g sodium persulphate in 70.7 g water and (b) a mixture of 54 g acrylic acid and 39 g of a 25% aqueous solution of sodium vinyl sulphonate.

On the completion of the additions the reaction mixture is heated for a further 2 hours at reflux then cooled to room temperature whereon it is diluted with 48 g water.

There are obtained 269.7 g of solution having solids content of 27.3% and $^{31}$P n.m.r. analysis showing peaks at 52.4–49.3 (monomers-P-monomers) and 27.4–25.4 (H-P-monomers) each downfield from $H_3PO_4$.

EXAMPLE 15

Cotelomer of acrylic acid and 3-buten-1,2,3-tricarboxylic acid, in the ratio of 79.3:20.7 respectively, with sodium hypophosphite in the molar ratio of total monomers:sodium hypophosphite of 16:1.

To 50 g water at 100° C. are simultaneously added over 2 hours:

(a) a solution of 64.8 g acrylic acid, 16.9 g 3-buten-1,2,3-tricarboxylic acid and 5.44 g sodium hypophosphite in 150 g water and (b) a solution of 4.1 g sodium persulphate in 150 g water.

On the completion of additions, the reaction mixture is heated for a further 2 hours at reflux and then cooled to room temperature. There are obtained 503.3 g of a water white solution having solids content of 30.2% and $^{31}$P n.m.r. analysis showing peaks at 48.4 (monomers-P-monomers) and 28.3 (H-P-monomers) each downfield from $H_3PO_4$.

EXAMPLE 16

Cotelomer of acrylic acid and (2-carboxyethyl)acrylate in the ratio of 75:25 respectively, with sodium hypophosphite in the molar ratio of total monomers:sodium hypophosphite of 16:1.

The procedure of Example 15 is followed excepting that solution (a) contains 60 g acrylic acid, 20 g (2-carboxyethyl)acrylate and 5.3 g sodium hypophosphite; solution (b) contains 1.4 g sodium persulphate.

There are obtained 399.3 g of a water white solution having solids content of 20.3% and $^{31}$P n.m.r. analysis showing peaks at 46.0 (monomers-P-monomers) and 27.1 (H-P-monomers) each downfield from $H_3PO_4$.

EXAMPLE 17

Cotelomer of acrylic acid and 3-sulphopropylacrylic ester potassium salt in the ratio of 75.6:24.4 respectively, with sodium hypophosphite in the molar ratio of total monomers to sodium hypophosphite of 16:1.

The procedure of Example 15 is followed except that in solution (a) 3-buten-1,2,3-tricarboxylic acid is replaced by 20.9 g 3-sulphopropylacrylic ester potassium salt and solution (b) contains 1.5 g sodium persulphate.

There are obtained 421.6 g of a water white solution having solids content of 21.8% and $^{31}$P n.m.r. analysis showing peaks at 45.5 (monomers-P-monomers) and 27.2 (H-P-monomers) each downfield from $H_3PO_4$.

EXAMPLE 18

Cotelomer of acrylic acid and a polyethylene glycol ester of methacrylic acid (m.wt. of polyethylene glycol is 90) in the ratio of 81.8:18.2 respectively, with sodium hypophosphite in the molar ratio of total monomers to sodium hypophosphite of 16:1.

The procedure of Example 17 is followed except that the 3-sulphopropylacrylic ester potassium salt is replaced by 14.4 g of the polyethyleneglycolmethacrylate.

There are obtained 440.5 g of a water white solution having solids content of 18.7% and $^{31}P$ n.m.r. analysis showing peaks at 45.8 (monomers-P-monomers) and 27.0 (H-P-monomers) each downfield from $H_3PO_4$.

EXAMPLE 19

Cotelomer of acrylic acid and 2-acrylamido-2-methyl propane sulphonic acid (AMPS monomer) in the ratio of 77.7:22.3 respectively, with sodium hypophosphite in the molar ratio of total monomers to sodium hypophosphite of 16:1.

The procedure of Example 17 is followed except that the 3-sulphopropylacrylic acid ester potassium salt is replaced by 18.6 g of AMPS monomer.

There are obtained 410.5 g of a water white solution having solids content of 21.8% and $^{31}P$ n.m.r. analysis showing peaks at 51.5 (monomers-P-monomers) and 32.7 (H-P-monomers) each downfield from $H_3PO_4$.

EXAMPLE 20

Test for hydrolytic stability 3 g of the product of Example 19 were dissolved in 300 mls of water and the pH adjusted to 9.5 with 0.3M sodium hyroxide solution. A radiometer 'Titrigraph SBR3' was set in the pH-STAT mode so that any acid liberated by hydrolysis would be automatically neutralised, maintaining the pH at 9.5. The solution was stirred at 60° C. for 18 hours with no further addition of sodium hydroxide, indicating that the compound is hydrolytically stable under these conditions.

EXAMPLE 21

Cotelomer of acrylic acid and N-vinyl-N-methylacetamide in the ratio of 87.9:12.1 respectively, with sodium hypophosphite in the molar ratio of total monomers to sodium hypophosphite of 16:1.

The procedure of Example 17 is followed except that the 3-sulphopropylacrylic acid ester potassium salt is replaced by 8.9 g of N-vinyl-N-methyl-acetamide.

There are obtained 431.2 g of a water white solution having solids content of 17.5% and $^{31}P$ n.m.r. analysis showing peaks at 45.8 (monomers-P-monomers) and 27.0 (H-P-monomers) each downfield from $H_3PO_4$.

EXAMPLE 22

Cotelomer of methacrylic acid and 2-acrylamido-2-methylpropanesulphonic acid in the ratio of 80.6:19.4 with sodium hypophosphite in the molar ratio monomers:sodium hypophosphite of 16:1.

To 50 g of water at reflux are simultaneously added over a period of 30 minutes (a) a solution of 77.4 g methacrylic acid, 18.6 g 2-acrylamido-2-methylpropanesulphonic acid, 5.5 g sodium hypophosphite and 50 g of 40% aqueous sodium hydroxide in 50 g of water and (b) a solution of 3 g sodium persulphate in 10 g of water. On completion of the additions the reaction mixture is heated for a further 2 hours at reflux. The solution is then cooled to room temperature.

There are obtained 426.5 g of a water white solution having solids content of 29.5% and $^{31}P$ n.m.r. analysis showing peaks at 41.2 (monomers-P-monomers) and at 27.3 to 32.8 (H-P-monomers) each downfield from $H_3PO_4$.

EXAMPLES 23 TO 29

Calcium phosphate threshold test

Solutions are prepared in distilled water of calcium chloride (36.76 g/l of $CaCl_2.2H_2O$) and disodium hydrogen phosphate (0.9367 g/l of $Na_2HPO_4.2H_2O$).

A 0.1% (weight/volume) solution of each of the products of Examples 2, 4, 11, 16, 18, 20, 27, 28 and 29, respectively, is prepared in distilled water.

To 1800 ml of distilled water in a 2 liter volumetric flask, previously cleaned with hot chromic acid, is added 20 ml of the calcium chloride solution, followed by 2 drops of concentrated hydrochloric acid. 40 ml of the disodium hydrogen phosphate solution is then added. The volume of the mixture is brought to 2 liters with distilled water. 100 ml aliquots of the mixed solution are placed in a small (112 ml) glass bottle fitted with a screw cap. To this solution is added sufficient of the solution of the test compound to provide the required concentration of the test compound in the final volume of test solution (100 ml). Thus, 1.0 ml of 0.1% solution of test compound gives a concentration of the test compound in the final solution of 10 ppm.

The pH of the mixed solution is adjusted to 8.0 and the bottle is sealed and placed in a water bath at 60° C. and left for 24 hours.

The samples are removed and filtered whilst hot through 0.22 micron filters. The filtrate is cooled to 20° C., its pH value is recorded and its phosphate content is determined by the following spectrophotometric method.

The following solutions are prepared:

A. Ammonium molybdate solution 25 g Ammonium molybdate are dissolved in 175 ml of distilled water. 280 ml of concentrated sulphuric acid (s.g. 1.84) are added cautiously, with cooling and stirring, to 400 ml of distilled water. After cooling the molybdate solution is added and the whole is diluted to 1000 ml with distilled water.

B. Stannous chloride solution 2.5 g Stannous chloride (A.R. $SnCl_2.2H_2O$) are dissolved in 100 ml (126 g) glycerol.

A calibration graph is then prepared showing the phosphate concentration (ranging from 6 ppm to 1 ppm) of six dillutions of the disodium hydrogen phosphate solution.

The spectrophotometric determination of phosphate content is then determined as follows:

2.5 ml aliquots of the diluted stock solutions (for the calibration graph) or filtrate (from the experimental procedure described above) are replaced in 50 ml standard volumetric containing 40 ml distilled water. 2.0 ml of ammonium molybdate solution and the whole mixed well. Finally, 5 drops of stannous chloride reagent are added, the total volume is made up to 50 ml and the mixture shaken well.

A control sample is made up as above but omitting the phosphate.

After allowing the blue colour to develop for at least 4 minutes, the optical densitiy (OD) is measured at 690 nm in a 4 cm cell. The control sample value is substracted from each test optical density reading.

For calibration, a curve is prepared of ppm $PO_4^{3-}$ (x axis) against O.D. readings (y axis) and, to determine the phosphate content of the filtrate, the ppm $PO_4^{3-}$ corresponding to the measured O.D. are read directly from the calibration graph and the result is multiplied by 2.

The % inhibition of calcium phosphate precipitation (I) is the calculated from the relation:

$$I = \frac{x - y}{10 - y} \times \frac{100}{1} \%$$

in which x is the $PO_4^{3-}$ content in ppm in the filtrate and y is the $PO_4^{3-}$ content in ppm of the additive-free control filtrate.

The results obtained are set out in the following Table I:

TABLE I

| | Calcium phosphate threshold test | |
|---|---|---|
| Example | Test compound | % inhibition at 10 ppm dose level |
| 23 | Product of Example 3 | 81 |
| 24 | Product of Example 9 | 88 |
| 25 | Product of Example 11 | 100 |
| 26 | Product of Example 17 | 97 |
| 27 | Product of Example 18 | 93 |
| 28 | Product of Example 19 | 100 |
| 29 | Product of Example 22 | 74 |

EXAMPLES 30 TO 34

Pre-precipitated calcium phosphate dispersancy test

A calcium phosphate suspension is prepared by circulating, at 40° C., a mixture containing 18.42 g $CaCl_2.6H_2O$ and 32.20 g $Na_3PO_4.12H_2O$ in 16 liters of tap water (Manchester, England) for 2 dyas. The pH of this suspension as prepared is 9.5-10.0 and the calcium phosphate precipitate level is 558 ppm (this takes account of calcium already present in the Manchester water as well as the added calcium), as hydroxyapatite.

100 ml of the above suspension is taken and its pH is adjusted to 8.0 using 1M hydrochloric acid solution.

A 0.1 weight/volume solution in distilled water of each test compound is prepared and 1.0 ml aliquot of this solution is pipetted into 100 ml of the above suspension in a glass screw-capped bottle, giving an additive concentration of 10 ppm.

The optical density of the test compound solution is then measured immediately in a 4 cm glass cell at wavelength 420 nm against distilled water (time=0).

The suspension in the cell is allowed to settle with minimum disturbance and the optical density is again measured at intervals of 90 and 120 minutes (time=x).

The calcium level ($Ca^{2+}$) is 222.3 mg/l (taking in to account calcium already present in the Manchester water and the added calcium) and the phosphate level ($PO_4^{3-}$) is 503.1 mg/l.

The percentage inhibition to settling (I) is then calculated from the relation:

$$I = \frac{\text{optical density of sample at time}(x) \times 100}{\text{optical density of sample at time}(o)}$$

in which x=90 or 120 minutes.

The results are summarised in the following Table II:

TABLE II

| | Calcium phosphate dispersion test | | |
|---|---|---|---|
| | | % inhibition to settling (I) | |
| Example | Test compound | 90 min. | 120 min. |
| — | none (control) | 10 | 8 |
| 30 | Product of Example 3 | 86 | 79 |
| 31 | Product of Example 16 | 81 | 72 |
| 32 | Product of Example 17 | 84 | 75 |
| 33 | Product of Example 19 | 92 | 86 |
| 34 | Product of Example 21 | 92 | 86 |

EXAMPLE 35

Calcium Carbonate Threshold Test

A volume (50 ml) of a solution containing sodium carbonate and sodium bicarbonate is mixed with 50 ml of another solution containing calcium chloride and magnesium chloride which already contains the additive under test. The resultant solution, through which air is bubbled at a constant rate, is stored at 70° C. for 30 minutes before filtration.

At the end of this time the calcium remaining in the filtrate is determined by EDTA titration.

The results are expressed as % inhibition of calcium carbonate precipitation.

Reagents (a) Solution 1
1.10 g/liter $CaCl_2.2H_2O$)
+0.75 g/liter $MgCl_2.6H_2O$)
(This gives 150 ppm as $Ca^{++}$ and 44 ppm as $Mg^{++}$ in the final 100 ml test solution).

(b) Solution 2
0.088 $Na_2CO_3$)
+0.88 $NaHCO_3$)
(This gives 25 ppm as $CO_3^{--}$ and 320 ppm as $^-HCO_3$ in the final 100 ml test solution).

(c) 0.1% solids additive solutions. (Solution 3)

A constant temperature water bath is set at 70° C.

50 ml of solution 1 is placed in a 4 oz glass bottle together with the required volume of additive solution* (Solution 3).

*In order to introduce 4 or 6 ppm additive solids, 0.4 or 0.6 ml respectively of solution 3 is pipetted into the bottle.

50 ml of solution 2 is then added.

The bottle with cap and bubbler tube is placed in the water bath with the air flow set at the rate of 0.51 per minute per bottle.

A duplicate test is also effected together with blanks containing no additive.

After 30 minutes the bottle is removed from the bath and the solids immediately filtered off.

40 ml aliquot of filtrate is pipetted into a porcelain dish.

4 drops of 50:50 hydrochloric acid solution is added to remove $CO_2$.

Excess NaOH (2 to 3 pellets) is then added+little Patton and Reeder's calcium indicator.

The resulting solution is titrated with 0.01M EDTA solution with stirring until the reddish-violet colour of the indicator turns to pure bright blue (no reddish tinge remaining).

Calculation $$I\% = \frac{(\text{Titre}^* - \text{blank titre}^*)}{14.96 - \text{blank titre}} \times \frac{100}{1}$$

*To take account of evaporation losses of ca. 3% during the experiment, the titration figures in each case are multiplied by a correction factor of 0.97.

14.96 is the maximum possible titration for 100% I.
I% = Percentage inhibition of calcium carbonate precipitation.
The results are set out in Table III:

TABLE III

| Example | Test compound | % inhibition to precipitation at dose level | |
|---|---|---|---|
| | | 4 ppm | 6 ppm |
| 35 | Prod. Ex. 19 | 87.7 | 99.2 |

EXAMPLE 36

Calcium Sulphate Threshold Test

A volume (50 ml) of a sodium sulphate/sodium chloride solution is added to the same volume of a calcium chloride/sodium chloride solution which already contains the additive under test. The pH of the resultant solution is adjusted where necessary to 8.0-8.5 and then is stored at 70° C. for 24 hours.

At the end of this time the calcium remaining in solution is determined by EDTA titration. (Initially the $CaSO_4$ is present at 5-6× its saturation concentration). The results are expressed as %I Inhibition of calcium sulphate precipitation.

Reagents (a) Solution 1
21.61 g/liter $CaCl_2.2H_2O$
+7.5 g/liter NaCl
(This gives 2.94 g/l as $Ca^{++}$ in final 100 ml test solution).
(b) Solution 2
21.3 g/liter $Na_2SO_4$)
+7.5 g/liter NaCl)
(This gives 7.20 g/l as $SO_4^{--}$ in final 100 ml test solution).
(c) 0.1% solids additive solutions—Solution 3.

The constant temperature water bath is set at 70° C.

50 ml of solution 1 is placed in a 4 oz glass bottle together with the required volume of additive solution—Solution 3 (e.g. 1.0 ml of 0.1% additive solids solution gives an additive solids test concentration of 10 ppm).

50 ml of solution 2 is then added.

The pH of the test solution is measured and where necessary neutralised by addition of M/10 sodium hydroxide solution to pH 8.0 to 8.5.

The screw cap is placed tightly on the bottle and the bottle is immersed in the CT bath at 70° C. for 24 hours.

A duplicate test is also effected together with blanks containing no additive.

A 5.0 aliquot is withdrawn and 2 pellets of sodium hydroxide added (pH 10.0)+a little Patton and Reeder's calcium indicator+ca. 10 ml distilled water.

The resulting solution is titrated with 0.01M EDTA solution with stirring until the reddish-violet colour of the indicator turns to pure bright blue (no tinge of red remaining).

Calculation $$I\% = \frac{(\text{Titre} - \text{blank titre})}{36.73 \text{ blank titre}} \times \frac{100}{1}$$

I% = Percentage inhibition of calcium sulphate precipitation.
36.73 is the maximum possible titration for 100% I.
The Results are set out in Table IV:

TABLE IV

| Example | Test compound | % inhibition to precipitation at dose level | |
|---|---|---|---|
| | | 15 ppm | 20 ppm |
| 36 | prod. Ex. 19 | 68.0 | 95.7 |

EXAMPLE 37

Barium Sulphate Threshold Test

A volume (50 ml) of a sodium sulphate solution is added to the same volume of a barium chloride solution which already contains the additive under test. After addition of 1 ml of a sodium bicarbonate solution to buffer to pH at around 8.0 the resultant solution is stored at 25° C. for 24 hours.

At the end of this time the barium remaining in solution is determined by Atomic Absorption (AA). The results are expressed as % inhibition of barium sulphate precipitation.

Reagents (a) Solution 1
0.2472 g/l $BaCl_2.2H_2O$
(This gives 69.5 ppm as $Ba^{++}$ in final 100 ml test solution).
(b) Solution 2
0.1435 g/l $Na_2SO_4$
(This gives 48.5 ppm as $SO_4^{--}$ in final 100 ml test solution).
(c) Solution 3
1.377 g/100 ml $NaHCO_3$
(This gives an $^-HCO_3$ concentration of 100 ppm when 1.0 ml is added to final 100 ml test solution—82 ppm as $CaCO_3$).
(d) Solution 4
20 g/l NaCl solution.
(e) Solution 5
0.1% solids additive solutions.

Procedure

The constant temperature water bath is set at 25° C.

50 ml of solution 1 is placed in a 4 oz glass bottle together with the required volume of additive solution—Solution 5 (for 2, 3 or 4 ppm slids, pipette 0.2, 0.3 or 0.4 ml respectively).

1.0 ml of solution 3 is pipetted in.

Finally 50 ml of solution 2 is added.

The screw cap is placed tightly on the bottle and the bottle immersed in the CT bath at 25° C. for 24 hours.

A duplicate test is also effected together with blanks containing no additive.

25.0 ml of the clear supernatant liquor is carefully withdrawn and placed in a 100 ml graduated flask.

5.0 ml of solution 4 is added followed by distilled water up to the mark.

The Ba++ concentration of the solution is determined by Atomic Absorption.

Calculation $$I\% = \frac{(\text{ppm Ba}^{*++} - \text{ppm Ba}^{*++} \text{ (blank)})}{69.5 - \text{ppm Ba}^{*++} \text{ (blank)}}$$

*NB: Because test solution was diluted 4× for the purpose of (Ba++) measurement by AA, all these values are the AA readings multiplied by 4.

$I\%$ = Percentage of inhibition of barium sulphate precipitation.

The results are set out in Table V:

TABLE V

| | | % inhibition to precipitation at dose level | | |
|---|---|---|---|---|
| Example | Test compound | 2 ppm | 3 ppm | 4 ppm |
| 37 | Prod. Ex. 19 | 62 | 98.7 | 96.5 |

What we claim is:

1. A cotelomer compound having the formula

     (I)

and salts thereof wherein

A is a random polymeric residue comprising at least one unit of formula II

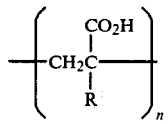     (II)

and at least one unit of formula III, different from a unit of formula II,

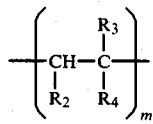     (III)

and B is hydrogen or a residue A; wherein m and n are integers such that the sum of m+n is an integer of from 3 to 100, the ratio of n:m being from 99 to 1:1 to 99, provided that the resulting telomers are water-soluble and wherein m, n or m and n in a residue A are the same or different from m, n or m and n in a residue B;

R is hydrogen, methyl or ethyl;

$R_1$ is a residue —OX, wherein X is hydrogen, an alkali metal, an alkaline earth metal, ammonium or an amine residue;

$R_2$ is hydrogen, methyl or a residue —COOR$_5$ wherein R$_5$ is hydrogen or a straight or branched chain alkyl having 1 to 8 carbon atoms;

$R_3$ is hydrogen, a straight or branched chain alkyl having 1 to 4 carbon atoms, hydroxymethyl or —COOR$_6$ wherein R$_6$ is hydrogen, a residue of the formula

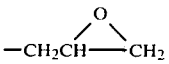

or a residue of the formula

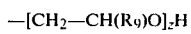

in which R$_9$ is hydrogen, methyl or phenyl and z is an integer from 1 to 20, or R$_6$ is a straight or branched chain alkyl having 1 to 8 carbon atoms or said alkyl substituted by —SO$_3$M or by —COOM where M is hydrogen or an alkali metal or alkaline earth metal atom;

$R_4$ is —COOR$_6$ where R$_6$ is as defined above, or R$_4$ is a straight or branched alkyl having 1 to 8 carbon atoms or said alkyl substituted by one to three carboxylic acid groups; or R$_4$ is phenyl or said phenyl substituted by —SO$_3$M or by —PO$_3$M$_2$; or R$_4$ is acetoxy, hydroxymethyl, acetoxymethyl, —SO$_3$M, —CH$_2$SO$_3$M, —PO$_3$M$_2$ or —PO$_3$M'$_2$ in which M is hydrogen or an alkali metal or alkaline earth metal atom and M' is M or alkyl of 1 to 4 carbon atoms; or R$_4$ is a residue —CONR$_7$R$_8$ wherein R$_7$ and R$_8$ are the same or different and each is hydrogen, straight or branched chain alkyl having 1 to 8 carbon atoms, hydroxymethyl, —CH(OH)COOM, —C(CH$_3$)$_2$CH$_2$SO$_3$M, —C(CH$_3$)$_2$CH$_2$PO$_3$M$_2$ or —N(R$_{10}$)COCH$_3$ in which R$_{10}$ is hydrogen or straight or branched chain alkyl of 1 to 4 carbon atoms, with the proviso that, when R$_2$ and R$_3$ are each hydrogen, then R$_4$ is other than —COOR$_6$ in which R$_6$ is —CH$_2$CH(R$_9$)OH where R$_9$ is hydrogen or methyl.

2. A compound of formula I according to claim 1, wherein R is hydrogen or methyl.

3. A compound of formula I according to claim 1, wherein B is a residue A as defined in claim 1.

4. A compound of formula I according to claim 1, wherein R$_1$ is a residue of formula —OX wherein X is as defined in claim 1.

5. A compound of formula I according to claim 4 wherein X is an alkali metal.

6. A compound of formula I according to claim 5 wherein the alkali metal is sodium.

7. A compound of formula I according to claim 1 wherein

B is a residue A,

R is hydrogen or methyl,

R$_2$ is hydrogen, methyl or —COOR$_5$ wherein R$_5$ is hydrogen or alkyl of 1 to 8 carbon atoms, R$_3$ is hydrogen, methyl or —COOR$_6$ wherein R$_6$ is defined in claim 30, and R$_4$ is —COOR$_6$, or R$_4$ is alkyl of 1 to 8 carbon atoms or said alkyl substituted by one to three carboxyl groups, or R$_4$ is phenyl, acetoxy, hydroxymethyl, acetoxymethyl, —SO$_3$M, —PO$_3$M$_2$ or —PO$_3$M'$_2$ in which M is defined in claim 30 and M' is M or ethyl, or R$_4$ is —CONR$_7$R$_8$ or —N(R$_{10}$)COCH$_3$ where R$_7$, R$_8$ and R$_{10}$ are defined in claim 30, and the sum of m and n is from 3 to 32.

8. A compound of formula I according to claim 1 wherein

R is hydrogen,

R$_2$ is hydrogen, methyl or —COOR$_5$ where R$_5$ is methyl, $R_3$ is hydrogen, methyl or carboxyl, and
$R_4$ is —COOR$_6$ where R$_6$ is hydrogen, methyl, 2-carboxyethyl, —CH$_2$CH$_2$CH$_2$SO$_3$K or —(CH$_2$CH$_2$O)$_z$H where z is 2, or
$R_4$ is —SO$_3$Na, phenyl, hydroxymethyl, acetoxy, —PO(OC$_2$H$_5$)$_2$, —CH$_2$COOH or —CH(COOH)CH$_2$COOH, or
$R_4$ is —CONH$_2$, —CONHCH$_2$OH, —CONHCH(OH)COOH or —CONHC(CH$_3$)$_2$CH$_2$SO$_3$H.

9. Process for the production of compounds of formula I according to claim 1 comprising reacting n moles of an acid of formula IV $$CH_2=CR-CO_2H \quad (IV)$$

m moles of a compound having the formula V

wherein R, R$_2$, R$_3$, R$_4$, n and m are as defined in claim 1, and one mole of a compound of formula

wherein R$_1$ is as defined in claim 1.

10. Process according to claim 9 wherein R$_1$ is a residue —OX in which X is an alkali metal.

11. Process according to claim 10 wherein the alkali metal is sodium.

12. Method of treating a wholly or partly aqueous system, in contact with metal surfaces, in order to inhibit scale formation on the metal surfaces or to inhibit corrosion of the metal surfaces or to facilitate dispersion of particulate matter in the aqueous system or inhibit sealing smut deposition therefrom, comprising adding to the aqueous system a functionally-effective amount of a cotelomeric compound of formula I, as defined in claim 1, or a salt thereof.

13. Method according to claim 12, wherein the compound of formula I R is hydrogen or methyl.

14. Method according to claim 12, wherein the compound of formula I substituent B in the compound of formula I is a residue A as defined in claim 1.

15. Method according to claim 12 wherein the compound of formula I X is an alkali metal.

16. Method according to claim 15 wherein the alkali metal is sodium.

17. A method according to claim 12 wherein the compound of formula I
B is a residue A,
R is hydrogen or methyl,
R$_2$ is hydrogen, methyl or —COOR$_5$ wherein R$_5$ is hydrogen or alkyl of 1 to 8 carbon atoms,
R$_3$ is hydrogen, methyl or —COOR$_6$ wherein R$_6$ is hydrogen a residue of the formula

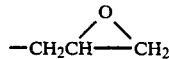

or a residue of the formula

—[CH$_2$—CH(R$_9$)O]$_z$H in which R$_9$ is hydrogen, methyl or phenyl and z is an integer from 1 to 20, or R$_6$ is a straight or branched chain alkyl having 1 to 8 carbon atoms or said alkyl substituted by —SO$_3$M or by —COOM where M is hydrogen or an alkali metal alkaline earth metal atom;
R$_4$ is —COOR$_6$, or R$_4$ is alkyl of 1 to 8 carbon atoms or said alkyl substituted by one to three carboxyl groups, or R$_4$ is phenyl, acetoxy, hydroxymethyl, acetoxymethyl, —SO$_3$M, —PO$_3$M$_2$ or —PO$_3$M'$_2$ in which M is hydrogen or an alkali metal or alkaline earth metal atom and M' is M or ethyl or R$_4$ is a residue —CONR$_7$R$_8$ wherein R$_7$ and R$_8$ are the same or different and each is hydrogen, straight or branched chain alkyl having 1 to 8 carbon atoms, hydroxymethyl, —CH(OH)COOM, —C(CH$_3$)$_2$CH$_2$SO$_3$M, —C(CH$_3$)$_2$CH$_2$PO$_3$M$_2$ or —N(R$_{10}$)COCH$_3$ in which R$_{10}$ is hydrogen or straight or branched chain alkyl of 1 to 4 carbon atoms,
the sum of m and n is from 3 to 32, and
with the proviso that, when R$_2$ and R$_3$ are each hydrogen, then R$_4$ is other than —COOR$_6$ in which R$_6$ is —CH$_2$CH(R$_9$)OH where R$_9$ is hydrogen or methyl.

18. A method according to claim 12 wherein the compound of formula I
R is hydrogen,
R$_2$ is hydrogen, methyl or —COOR$_5$ where R$_5$ is methyl,
R$_3$ is hydrogen, methyl or carboxyl, and
R$_4$ is —COOR$_6$ where R$_6$ is hydrogen, methyl, 2-carboxyethyl, —CH$_2$CH$_2$CH$_2$SO$_3$K or —(CH$_2$CH$_2$O)$_z$H where z is 2, or
R$_4$ is —SO$_3$Na, phenyl, hydroxymethyl, acetoxy, —PO(OC$_2$H$_5$)$_2$, —CH$_2$COOH or —CH(COOH)CH$_2$COOH, or
R$_4$ is —CONH$_2$, —CONHCH$_2$OH, —CONHCH(OH)COOH or —CONHC(CH$_3$)$_2$CH$_2$SO$_3$H.

19. Method according to claim 12 wherein the aqueous system heated requires only corrosion-inhibiting treatment and a compound of formula I is added in amount of 0.1 to 50000 ppm.

20. Method according to claim 19, wherein a compound of formula I is added in amount of 1 to 500 ppm.

21. Method according to claim 12, wherein the aqueous system requires only anti-scale treatment and a compound of formula I is added in amount of 1 to 200 ppm.

22. Method according to claim 21, wherein a compound of formula I is added in amount of 1 to 30 ppm.

23. Method according to claim 12, wherein the aqueous system is a dilute dispersion and a compound of formula I is added, as dispersant, in amount of 1 to 200 ppm.

24. Method according to claim 23, wherein a compound of formula I is added in amount of 2 to 20 ppm.

25. Method according to claim 12, wherein the aqueous system is used to seal an anodically produced oxide layer on an aluminium surface and contains, as sealing smut inhibitor, 0.0005 to 0.5 g/l of a compound of formula I.

* * * * *

UNITED STATES PATENT AND TRADEMARK OFFICE
CERTIFICATE OF CORRECTION

PATENT NO. : 4,681,686

DATED : JULY 21, 1987

INVENTOR(S) : NORMAN RICHARDSON, ET AL.

It is certified that error appears in the above—identified patent and that said Letters Patent is hereby corrected as shown below:

On the cover page, Item [73] should be inserted to read -- Assignee: Ciba-Geigy Corporation, Ardsley, New York --.

On the cover page, should read -- Attorney, Agent or Firm- Luther A.R. Hall --.

Signed and Sealed this

Fourth Day of October, 1988

Attest:

DONALD J. QUIGG

*Attesting Officer*  *Commissioner of Patents and Trademarks*